May 20, 1924.

A. BAKER

LINE AND GROUND WIRE CONNECTER

Filed Feb. 19, 1923

1,494,332

Arthur Baker,
Inventor.

By C. A. Snow & Co.
Attorneys

Patented May 20, 1924.

1,494,332

UNITED STATES PATENT OFFICE.

ARTHUR BAKER, OF BRECKENRIDGE, MISSOURI.

LINE AND GROUND WIRE CONNECTER.

Application filed February 19, 1923. Serial No. 619,988.

*To all whom it may concern:*

Be it known that I, ARTHUR BAKER, a citizen of the United States, residing at Breckenridge, in the county of Caldwell and State of Missouri, have invented new and useful Line and Ground Wire Connecters, of which the following is a specification.

This invention relates to telephone ground wire connections, the primary object of the invention being to provide means for connecting the line and ground wires with the interior wires that connect with the telephone, within a building.

An object of the invention is to provide means, whereby the line wire may have connection with a building from any angle or direction, and at all times, be clear and free from the building, thereby reducing the possibilities of firing the building by lightning.

Another object of the invention is to provide a device of this character wherein the wires may be secured against accidental displacement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
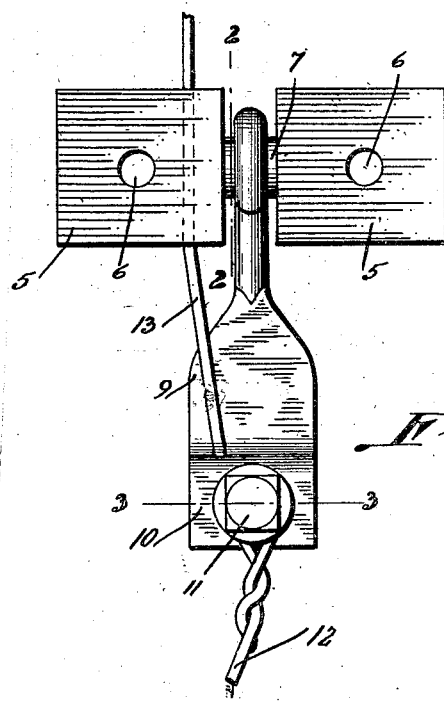
Figure 1 is a front elevational view of a support and connection constructed in accordance with the invention.
Figure 2:
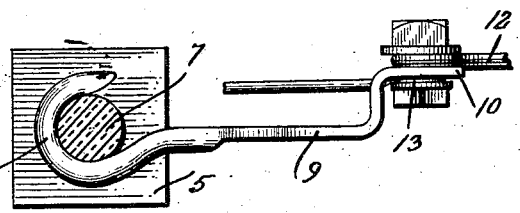
Figure 2 is a sectional view taken on line 2—2 of Figure 1.
Figure 3:
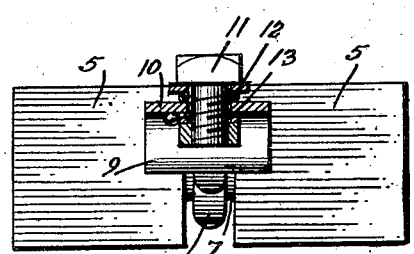
Figure 3 is a sectional view taken on line 3—3 of Figure 1.

Referring to the drawing in detail, the support includes a pair of insulating members 5 which are formed preferably of porcelain and provided with openings 6 to receive securing nails, whereby the device may be secured to a building.

Connecting the insulating members 5, is a rod 7 which has its surface spaced from the edges of the members 5 to accommodate the hook member which is formed of any suitable conducting material. This hook member is provided with a relatively flat body portion 9 which is offset as at 10 and provided with an opening to accommodate the securing bolt 11 to which the ground or line wires of a telephone may be connected, the ground wire being illustrated by the numeral 12 in Figure 1 of the drawing.

The body portion 5 is formed with an opening to permit the wire 13 which extends into the building and connects with the telephone to be secured to the securing bolt 11 there being provided a nut 13 for securing the wire to the bolt after the same has been properly positioned.

As shown, the wire 13 extends through a suitable opening in one of the porcelain members 5, thereby holding the wire in spaced relation with the building.

From the foregoing it will be seen that the hook member 8 may be readily and easily positioned and due to the connection between the hook member and insulating members 5, the hook member will assume any desired position, thereby permitting the connecter to be used with ground wires which are disposed at various angles with respect to the building.

Having thus described the invention, what is claimed as new is:—

In a support, a pair of insulating members held in spaced relation with each other, a rod positioned between the insulating members, a hook member adapted to be positioned over the rod and adapted for adjustment between the insulating members, said hook member having a relatively flat portion, an offset portion forming a part of the relatively flat portion, a wire securing bolt passing through the offset portion and said bolt adapted to secure wires to the hook member.

In testimony that I claim the foregoing as my own, I have hereto affixed my signature in the presence of two witnesses.

ARTHUR BAKER.

Witnesses:
W. J. WORKMAN,
ANNA GRAY LOONEY.